US008447027B2

(12) United States Patent
Lin et al.

(10) Patent No.: US 8,447,027 B2
(45) Date of Patent: May 21, 2013

(54) SYSTEM AND METHOD FOR LANGUAGE VARIATION GUIDED OPERATOR SELECTION

(75) Inventors: Xiaofan Lin, San Jose, CA (US); Steven J. Simske, Fort Collins, CO (US); Sherif Yacoub, Sant Cugat del Valles (ES); Roland John Burns, Sant Cugat des Valles (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 3217 days.

(21) Appl. No.: 10/769,240

(22) Filed: Jan. 30, 2004

(65) Prior Publication Data

US 2005/0171792 A1    Aug. 4, 2005

(51) Int. Cl.
*H04M 3/00*    (2006.01)
(52) U.S. Cl.
USPC ................................. 379/265.01; 379/265.12
(58) Field of Classification Search
USPC ........................................ 379/265.1–265.12
See application file for complete search history.

(56) References Cited

U.S. PATENT DOCUMENTS

| | | | |
|---|---|---|---|
| 4,896,358 A * | 1/1990 | Bahler et al. | 704/257 |
| 6,122,361 A * | 9/2000 | Gupta | 379/223 |
| 6,411,687 B1 | 6/2002 | Bohacek et al. | |
| 6,798,876 B1 * | 9/2004 | Bala | 379/265.12 |
| 6,847,714 B2 * | 1/2005 | Das et al. | 379/265.12 |
| 7,023,979 B1 * | 4/2006 | Wu et al. | 379/265.11 |
| 2002/0046030 A1 | 4/2002 | Haritsa et al. | |

FOREIGN PATENT DOCUMENTS

| | | |
|---|---|---|
| EP | 1076329 | 2/2001 |
| EP | 1172995 | 1/2002 |

OTHER PUBLICATIONS

Theophano Mitsa,Image Registration Using Elastic Contours andInternal Landmarks, May 18, 1998, IEEE Instrumentation and Measurement Technology Conference st. Paul, Minnesota, USA, 0-7803-4797-8/98,p. 451-455.*

Theophano Mitsa, Image Registration Using Elastic Contours and Internal Landmarks, May 18, 1998, IEEE instrumentation and Measurement Technology Conference St. Paul, Minnesota, USA 0-7803, p. 451-455.*

David R. Miller et al—"Statistical Dialect Classification Based on Mean Phonetic Features"—Proceedings ICSLIP vol. 4 1996—pp. 2025-2027.

Yochai Konig et al—"Supervised and Unsupervised Clustering of the Speaker Space for Connectionist Speech Recongnition"—Proceedings IEEE International Conferenced on Acoustics, Speech and Signal Processing (ICASSP) Apr. 1993.

* cited by examiner

*Primary Examiner* — Amal Zenati (57) ABSTRACT

A system and method for language variation guided operator selection is disclosed. The method discloses: initiating a dialog between a contact and a call handling system; identifying a language variation spoken by the contact; determining a skill level with respect to the language variation for each operator within a set of operators; selecting an operator whose skill level in the language variation is above a predetermined value; and transferring the dialog with the contact to the operator. The system discloses means and embodiments for implementing the method.

24 Claims, 4 Drawing Sheets

SYSTEM AND METHOD FOR LANGUAGE VARIATION GUIDED OPERATOR SELECTION

CROSS-REFERENCE TO RELATED CO-PENDING APPLICATION

This application may relate to co-pending U.S. patent application Ser. No. 10/676995, entitled "System And Method For Operator Assisted Automated Call Handling," filed on Sep. 30, 2003, by Lin, and co-pending U.S. Patent Application PDNo. 200310012, entitled "System And Method For Extracting Demographic Information," filed on Jan. 30, 2004, by Yacoub et al. These related applications are commonly assigned to Hewlett-Packard of Palo Alto, Calif.

BACKGROUND OF THE INVENTION

1. Field of the Invention

The present invention relates generally to systems and methods for call handling, and more particularly to language variation guided operator selection.

2. Discussion of Background Art

Automated call handling systems, such as Interactive Voice Response (IVR) systems, using Automatic Speech Recognition (ASR) and Text-to-speech (TTS) software are increasingly important tools for providing information and services in a more cost efficient manner. IVR systems are typically hosted by a server that includes an array of Digital Signal Processors (DSPs), and enable users to interact with corporate databases and services over a telephone using a combination of voice utterances and telephone button presses. IVR systems are particularly cost effective when a large number of users require data or services that are very similar in nature and thus can be handled in an automated manner, often providing a substantial cost savings due to a need for fewer human operators.

In an ideal situation, an IVR system would be able to automatically guide a user through an entire transaction using only predefined dialogs, without any human interference. In reality, speech recognition technology is still limited in some ways and so users still need to be connected to human operators. Such operators, however, can find understanding the user just as difficult. This may be especially true in countries with a significant language, dialect, or accent diversity. Such user language variations often present such a significant challenge to telephone operators, that it may have an adverse effect on the call center's effectiveness and cost efficiency.

Call center effectiveness is affected if the user becomes frustrated at having to repeat or rephrase often. Sometimes the user can feel insulted if believing that they can fluently speak the language, the human operator still can not understand them. This is an example of language-understanding mismatch that can have a negative business impact.

Call center cost efficiency is affected if transactions take longer to finish due to language difficulties thereby requiring more resources such as higher phone bills and a greater number of voice operators that must be hired to keep call waiting times below a predetermined level.

In response to the concerns discussed above, what is needed is a system and method for operator selection that overcomes the problems of the prior art.

SUMMARY OF THE INVENTION

The present invention is a system and method for language variation guided operator selection. The method of the present invention includes the elements of: initiating a dialog between a contact and a call handling system; identifying a language variation spoken by the contact; determining a skill level with respect to the language variation for each operator within a set of operators; selecting an operator whose skill level in the language variation is above a predetermined value; and transferring the dialog with the contact to the operator. The system of the present invention includes means and embodiments for implementing the method.

These and other aspects of the invention will be recognized by those skilled in the art upon review of the detailed description, drawings, and claims set forth below.

DETAILED DESCRIPTION OF THE PREFERRED EMBODIMENT

The present invention provides a number of solutions for enabling human operators to provide call center services to contacts having a wide diversity of languages. Such language deviations are herein defined to include not only completely different languages, but also variations in accent, dialect, and so on within a single language or language family. Improved methods for analyzing a contact's language variations and a method for monitoring operator performance with respect to such language variations and managing call center resource typologies are also presented.

Using the present invention, call center operators are assigned based on their language and cultural strengths, reducing the chance of a contact-operator mismatch, thereby permitting the dialog between the contact and operator to proceed more smoothly and the transaction to be completed more quickly. Also, those calling in to contact the present invention are likely to be happier since they will be better understood. Culture barriers can also be reduced when contacts are routed to operators who understand not only their language, but also the contact's idiomatic usage, conversation style, and perhaps even sense of humor.

The present invention thus enhances contact satisfaction and call center performance, especially in countries having a great diversity of languages and language variations.

Figure 1:
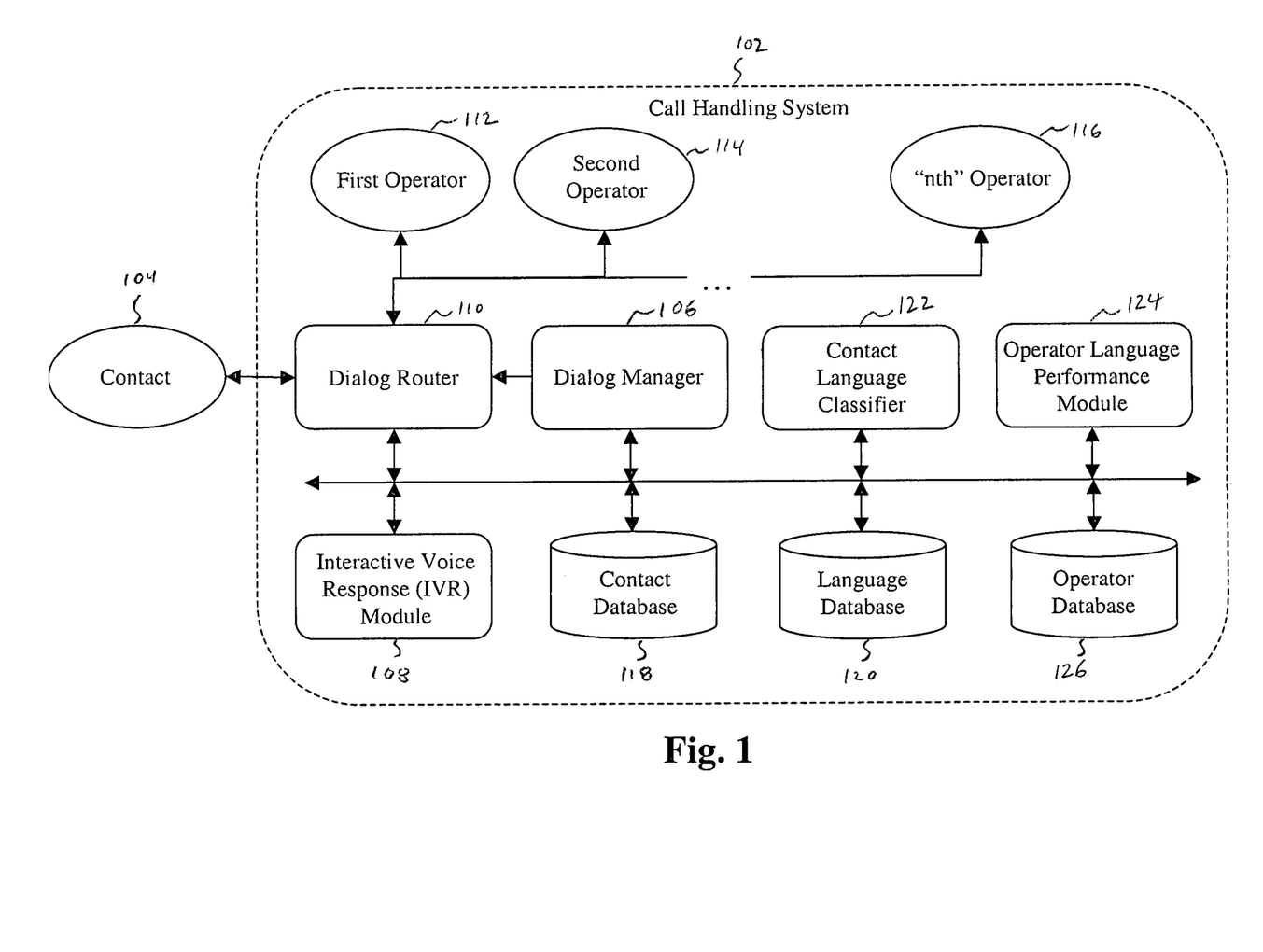
FIG. 1 is a dataflow diagram of one embodiment of a system for language variation guided operator selection within an interactive voice response system.

FIG. 1 is a dataflow diagram of one embodiment of a call handling system 102 for language variation guided operator selection. The call handling system 102 of the present invention preferably provides some type of voice interactive information management service to a set of contacts. Anticipated information services include those associated with customer response centers, enterprise help desks, business generation and marketing functions, competitive intelligence methods, as well as many others. Contacts may be customers, employees, or any party in need of the call center's services.

To begin a contact 104 enters into a dialog with the call handling system 102. While the dialog typically begins once a dialog manager 106 connects the contact 104 to an Interactive Voice Response (IVR) module 108 through a dialog router 110, alternative dialogs could route the contact 104 directly to a human operator 112, 114, or 116. The IVR module 108 provides an automated interface between the contact's 104 speech signals and the system's 102 overall functionality. To support such an interface with the contact 104, the IVR module 108 may include a Text-To-Speech (TTS) translator, Natural Language Processing (NLP) algorithms, Automated Speech Recognition (ASR), and various other dialog interpretation (e.g. a Voice-XML interpreter) tools.

As part of the dialog, the IVR module 108 receives information requests and responses from the contact 104 which are then stored in a contact database 118. While the IVR module 108 enables the system 102 to exchange information with the contact 104 in a very efficient manner, from time to time the dialog can be interrupted due to an inability of the IVR module 108 to correctly interpret the contact's 104 requests or responses.

In such cases, routing the contact 104 to an operator 112, 114, or 116 who can correctly interpret the contact's 104 requests or responses is required in order to successfully complete the dialog. Preparations for such a connection between the contact 104 and an operator 112, 114, or 116 are preferably completed in parallel with the ongoing dialog between the contact 104 and the IVR module 108 so that the contact 104 can be connected to an appropriate operator as soon as needed. Such an implementation of the present invention is described below. However, in alternate embodiments, the preparations can be delayed until a connection between the contact 104 and an operator is actually requested.

Preparations for identifying a language variation spoken by the contact 104 begin when a set of predefined language variations are stored in a language database 120. Some ways of selecting an appropriate set of language variations include: 1) those that experience has shown are particularly challenging to understand; 2) those variations that are different enough so that they can be reliably distinguished; and 3) those languages, dialects, accents, and so on which the call center where the system 102 is located has typically encountered. For example, if the system 102 serves residents of the United States, the following language variations within spoken English may be encountered: Standard English, African American, Southern, Indian, Chinese, Japanese, Arabic, French, and so on.

The contact language classifier 122 generates a set of confidence scores indicating a probability that the contact's speech signals within the dialog fall within any of the predefined language variations. The language classifier 122 generates such confidence scores based on prior training on the set of predefined language variations using either neural net, clustering (based on various voice parameters, including cepstral coefficients, and other voice signal processing elements), or other training methods. The contact's speech signals analyzed by the language classifier 122 can either be captured in real time from the contact 104 during the dialog, or retrieved from the contact database 118.

While the language classifier 122 can assign a confidence score ("p") to each language variation based only on various speech features extracted from the speech signal, preferably contact language variation classification is further improved using an inverse-distance weighting scheme.

The inverse-distance weighting scheme works by first selecting one of the language variations as an origin. Next, a distance between the origin language variation and each of the other language variations is calculated. Third, these distances are normalized with respect to the origin language variation. Then each normalized distance is multiplied by its respective confidence score. Finally, the results are summed to yield an inverse-distance weighted confidence score for the origin language variation.

Additional inverse-distance weighted confidence scores are then calculated by letting each of the other language variations take a turn as the origin, until all of the language variations have been selected as the origin.

Preferably the distance normalization factor is either adaptive or set by a large corpus of ground truth. Also individual cities can be further sub-clustered based on: regional languages, the happenstance of history (e.g. Miami may have many displaced northerners, West Texas was settled much later than Louisiana), as well as other language sub-clustering variations. International languages also can be viewed as having a distance between them. For example, Korea and Japan are geographically closer than Mexico and Estonia.

Those language variations having an inverse-distance weighted confidence score above a predetermined value are associated with the contact 104 and stored in the contact database 118. While preferably only the highest inverse-distance weighted confidence score is associated with the contact 104, in certain difficult or borderline cases two or more language variations may have similar inverse-distance weighted confidence score for the contact 104 and thus may be stored in the contact database as well. Subsequent phone calls by the contact 104 to the call handling system 102 may help distinguish these similar confidence scores further or be used to generate a report indicating that the set of predefined language variations could be improved upon to better distinguish the contacts.

The distance used in the inverse-distance weighting scheme can either be a physical distance or a virtual distance. Physical distance associates various geographic locations having known language variations. The contact's 104 geographic location can be approximated either based on the phone number the contact is calling from or an analysis of the contact's 104 language. Virtual distances however are based on various voice signature parameters of the contact 104 as measured using one or more of metrics, such as neural nets, voice pre-processing signal analysis, and so on.

An example of an inverse-distance weighted confidence score calculation is now discussed. In this example, the contact's 104 speech signal is compared with the following predetermined language variations labeled as: Chicago, Milwaukee, Minneapolis, and Saint Louis. First a normal set of confidence scores ("p") are calculated with respect to the contact's 104 speech signal. Then, a set of distances ("d") are calculated for each language variation with respect to each other language variation. Finally the inverse-distance weighting scheme is applied using the distances to improve the confidence scores.

The inverse-distance weighted confidence score, where Chicago is selected as a language variation origin is calculated first. So if the confidence scores and distances are: Chicago p=0.45; Milwaukee p=0.4, geographic distance from Chicago=100 km, 1/d=0.01; Minneapolis, p=0.3, geographic distance from Chicago=400 km, 1/d=0.0025; Saint Louis, p=0.25, geographic distance from Chicago=300 km, 1/d=0.0033; and the normalization factor is 0.01, which is the distance ratio from Chicago to Milwaukee, then the inverse-distance weighted confidence score for Chicago is=0.45+ 0.4*(0.01/0.01)+0.3*(0.0025/0.01)+0.25*(0.0033/ 0.01)=1.008.

The inverse-distance weighted confidence score, where Milwaukee is selected as a language variation origin is calculated next. If the confidence scores and distances are: Milwaukee p=0.4; Chicago p=0.45, geographic distance from Milwaukee=100 km, 1/d=0.01; Minneapolis, p=0.3, geographic distance from Milwaukee=300 km, 1/d=0.0025; Saint Louis, p=0.25, geographic distance from Milwaukee=400 km, 1/d=0.0033; and the normalization factor is 0.01, which is the distance ratio from Milwaukee to Chicago, then the inverse-distance weighted confidence score for Milwaukee is=0.40+0.45*(0.01/0.01)+0.3*(0.0033/0.01)+0.25*(0.0025/0.01)=1.0125

The inverse-distance weighted confidence scores for Minneapolis and Saint Louis would then also be calculated in a same manner.

As can be seen from this example, inverse-distance weighted confidence score for Milwaukee turns out to be higher than the inverse-distance weighted confidence score Chicago, even though Chicago had a higher basic confidence score ("p"). This shows how use of the inverse-distance weighting scheme can improve contact language variation predictions.

The contact's 104 language variation is retrieved from the contact database 118 each time the contact 104 calls the call handling system 102. Retrieval obviates the need to recalculate the contact's 104 inverse-distance weighted confidence score each time the contact 104 calls. To retrieve the correct inverse-distance weighted confidence score, the contact 104 preferably identifies themselves to the system 102 by entering in an account number.

In preparing to assign a best operator 112, 114, or 116 to the contact's 104 call, each operators 112, 114, and 116 skill level or performance with respect to each of the predetermined language variations is preferably determined using, an operator language performance module 124. In the embodiment described below, the operator performance module 124 calculates each operator's 112, 114, and 116 skill level for each of the language variations in real time, as each operator 112, 114, or 116 dialogs with a contact. However, those skilled in the art will recognize that other embodiments may first rate the operators on a series of test contacts each speaking with a different language variation. Such an embodiment may be preferred if the importance of not misinterpreting real contacts is quite high.

To begin, the operator performance module 124 assigns each operator an initial skill level with respect to each of the language variations. After the number of operators who performance has been rated with respect to a particular language variation reaches a predetermined threshold (preferably 10), then an average skill level for all of the rated operators is calculated and replaces the initial skill level assigned to an operator new to the language variation.

Next, the operator performance module 124 rates the difficulty of each dialog between a contact and an operator. There are several ways in which the difficulty score for a dialog can be determined. One way is for an operator to self rate themselves regarding how difficult a dialog was with a contact who speaks the language variation was after the dialog is complete.

Another way defines a set of dialog key words indicating communication difficulties, such as "sorry", "repeat", "say it again", "pardon" and "excuse me". Then the operator is rated based on how many of the key words the operator spoke in a dialog with a contact who speaks the language variation. The keywords can be detected using automatic speech recognition software running in the background. The number of such words or phrases reflects how difficult the dialog was.

A third way measures a time spent during the dialog between the contact and the operator on each menu, form, stage, or portion of the dialog, together with a number of words uttered during each portion. The operator is then rated based on the time spent and number of words spoken. More difficult dialogs will take longer and have a greater word count. Lastly, some combination of the above techniques can be used as well. Weighted linear summation of scores obtained from these techniques can be used to potentially increase the difficulty score's reliability.

The difficulty rating for the language variation of the dialog between the contact and the operator is associated with the operator and stored in an operator database 126. The operator performance module 124 determines each operator's overall skill level with respect to each language variation by averaging all of the operator's difficulty ratings within each language variation. Those skilled in the art recognize other ways of rating operator performance.

After the above preparations have been completed, the call handling system 102 is now ready to match the contact 104 with one of the operators 112, 114, or 116 should such a connection be requested.

The dialog manager 106 receives a request from either the IVR module 108 or the contact 104 to connect the contact 104 with an operator 112, 114, or 116. The IVR module 108 initiates the request if the IVR module 108 detects that a same question or response has been presented to or received from the contact 104 a predetermined number of times. The contact 104 can initiate a request by pressing a hot key (for example, "#" key) or speaking a special voice command, such as "Help".

Next, the dialog manager 106 retrieves the language variation associated with the contact 104 from the contact database 118, and identifies from the operator database 126 those operators having a skill level above a predetermined level for the contact's language variation.

The dialog manager 106 commands the dialog router 110 to transfer the contact 104 to that operator that is available and has a highest skill level for the contact's language variation. Alternatively, the dialog router 110 could queue the contact 104 with a soon to be available operator having a highest skill level for the contact's language variation. If more than one operator has equally high skill levels, then an arbitrary selection is made as to which operator to connect the contact 104 with.

Other information known about the contact 104 and the operators 112, 114, and 116 can be used to help identify which operator would be best suited to handle the contact's 104 call. Such other information may include: an operator's second language, and cultural background. For example, if the contact 104 speaks English with German-accent, then the contact 104 is preferably routed to an operator who both skillfully understands both German-accented English and German, and who knows the German culture. Such a cultural understanding on the part of the operator can yield a deeper understanding of the contact 104 than would otherwise be possible even if the operator knew the contact's language. For instance, interacting with a contact who is originally from Germany may be different than that of a contact who is originally from Italy.

The present invention's ability to access the language variations of contacts and operator performance with respect to such variations, permits the present invention to generate reports on how efficiently contacts are processed by the call handling system 102 and how the system's 102 typology might be modified.

The dialog manager 106 retrieves data from the contact database 118 and generates a report on which language variations the contacts calling the call center aggregate into. For example, 30% of the contacts may have a southern accent, 40% may have a western accent, 20% may have an eastern accent, and 10% may have a mid-western accent.

The dialog manager 106 retrieves data from the operator database 126 and generates a report on the skill levels of the operators 112, 114, and 116 with respect to each of the language variations. For example, 10% of the operators may be reasonably skilled in southern accents, 60% may be skilled in western accents, 20% may be skilled in eastern accents, and 10% may be skilled in mid-western accents.

The dialog manager 106 generates a report on any language variations disparities between contacts calling the call center and the skill level of operators at the call center. Such disparities enable a call center manager to make decision on which operators to hire at various call centers, how call center resources might be better allocated, and whether contact calls should be routed to a different call center having a greater number of operators skilled in that contact's language variation.

Figure 2:
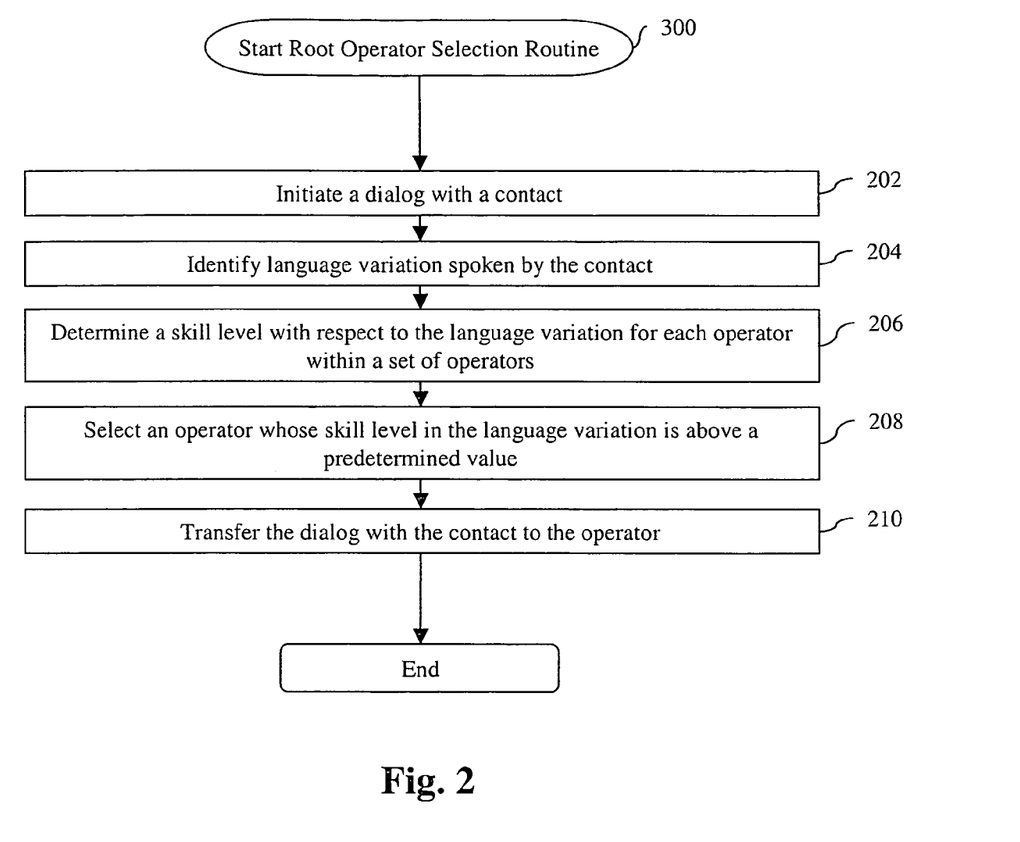
FIG. 2 is a root flowchart of one embodiment of a method for language variation guided operator selection within an interactive voice response system.

FIG. 2 is a flowchart of a one embodiment of a root method 200 for language variation guided operator selection. The method 200 begins in step 202 where a dialog between a contact and a call handling system is initiated. Next in step 204, a language variation spoken by the contact is identified. In step 206, a skill level with respect to the language variation for each operator within a set of operators is determined. In step 208, an operator whose skill level in the language variation is above a predetermined value is selected. Then in step 210 the dialog with the contact is transferred to the operator. The root method 200 is discussed in further detail with respect to FIGS. 3A and 3B below.

Figure 3A:
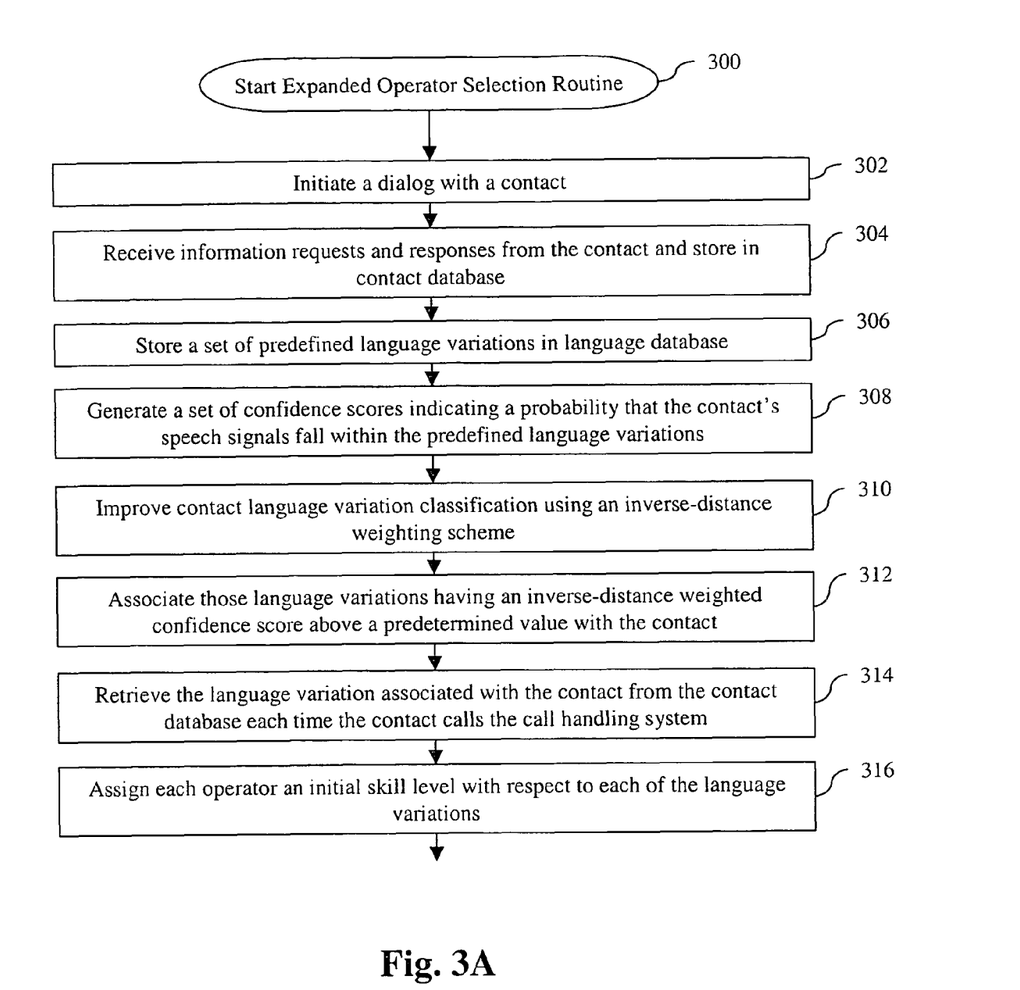
FIG. 3 is a flowchart of one embodiment of a method for language variation guided operator selection within an interactive voice response system.
Figure 3B:
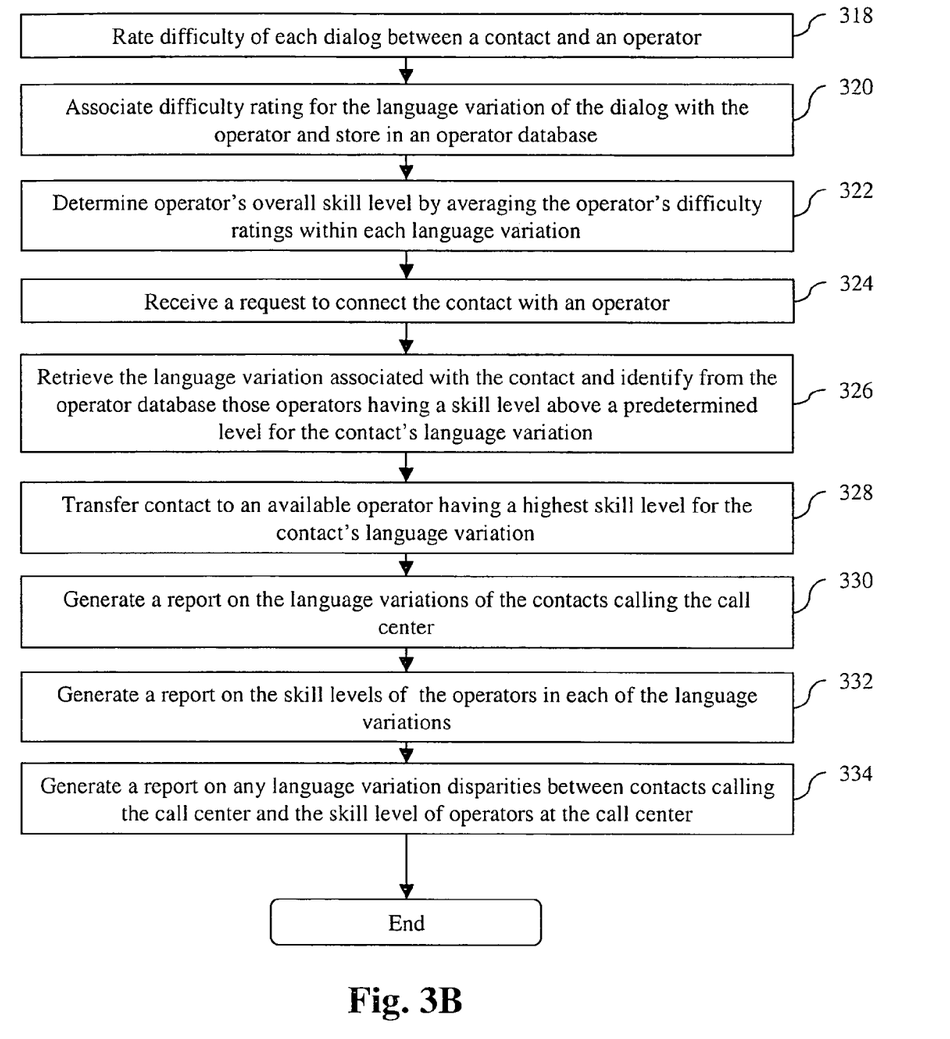

FIGS. 3A and 3B are a flowchart of one expanded embodiment 300 of the root method 200 for language variation guided operator selection. In step 302, a contact 104 enters into a dialog with the call handling system 102. In step 304, as part of the dialog, the IVR module 108 receives information requests and responses from the contact 104 that are then stored in a contact database 118.

Preparations for identifying a language variation spoken by the contact 104 begin in step 306, where a set of predefined language variations are stored in a language database 120. In step 308, the contact language classifier 122 generates a set of confidence scores indicating a probability that the contact's speech signals within the dialog fall within any of the predefined language variations. Contact language variation classification is further improved using an inverse-distance weighting scheme, in step 310. In step 312, those language variations having an inverse-distance weighted confidence score above a predetermined value are associated with the contact 104 and stored in the contact database 118. In step 314, the contact's 104 language variation is retrieved from the contact database 118 each time the contact 104 calls the call handling system 102.

In step 316, the operator performance module 124 assigns each operator an initial skill level with respect to each of the language variations. Next, in step 318, the operator performance module 124 rates the difficulty of each dialog between a contact and an operator. In step 320, the difficulty rating for the language variation of the dialog between the contact and the operator is associated with the operator and stored in an operator database 126. In step 322, the operator performance module 124 determines each operator's overall skill level with respect to each language variation by averaging all of the operator's difficulty ratings within each language variation. Those skilled in the art recognize other ways of rating operator performance.

After the above preparations have been completed, the call handling system 102 is now ready to match the contact 104 with one of the operators 112, 114, or 116 should such a connection be requested. So in step 324, the dialog manager 106 receives a request from either the IVR module 108 or the contact 104 to connect the contact 104 with an operator 112, 114, or 116. Next, in step 326, the dialog manager 106 retrieves the language variation associated with the contact 104 from the contact database 118, and identifies from the operator database 126 those operators having a skill level above a predetermined level for the contact's language variation. In step 328, the dialog manager 106 commands the dialog router 110 to transfer the contact 104 to that operator that is available and has a highest skill level for the contact's language variation.

In step 330, the dialog manager 106 retrieves data from the contact database 118 and generates a report on language variations into which the contacts calling the call center aggregate. In step 332, the dialog manager 106 retrieves data from the operator database 126 and generates a report on the skill levels of the operators 112, 114, and 116 with respect to each of the language variations. In step 334, the dialog manager 106 generates a report on any language variations disparities between contacts calling the call center and the skill level of operators at the call center.

While one or more embodiments of the present invention have been described, those skilled in the art will recognize that various modifications may be made. Variations upon and modifications to these embodiments are provided by the present invention, which is limited only by the following claims.

What is claimed is:

1. A method for operator selection, comprising: initiating, by a call handling system, a dialog between a contact and a call the call handling system; identifying, by the call handling system, a language variation spoken by the contact; determining, by the call handling system, a skill level with respect to the language variation for each operator within a set of operators following the initiation of the dialog between the contact and the call handling system, the skill level for each operator within the set of operators being determined on a real time basis while each operator is engaged in a dialog with a contact that has been transferred to that operator; selecting, by the call handling system, an operator whose skill level in the language variation is above a predetermined value; and transferring, by the call handling system, the dialog with the contact to the operator.

2. The method of claim 1, wherein determining includes:
receiving a self rating from an operator regarding how difficult a dialog was with a contact who speaks the language variation; and
updating the skill level of the operator using the self rating.

3. The method of claim 1, wherein determining includes:
defining a set of dialog key words indicating communication difficulties;
rating an operator based on how many of the key words the operator spoke in a dialog with a contact that speaks the language variation; and
updating the skill level of the operator using the rating.

4. The method of claim 1, wherein determining includes:
measuring a time an operator spent engaged in a dialog with a contact who speaks the language variation;
counting the number of words spoken during the dialog with the contact who speaks the language variation;
rating the operator based on the time spent and number of words spoken; and
updating the skill level of the operator using the rating.

5. The method of claim 1, wherein selecting includes:
selecting an operator with a highest skill level in the language variation.

6. The method of claim 1, wherein selecting includes:
queuing the contact with a soon to be available operator with a highest skill level in the language variation.

7. The method of claim 1, wherein selecting includes:
selecting an operator whose second language is equal to the language variation of the contact.

8. The method of claim 1, wherein selecting includes:
selecting an operator whose cultural background is associated with the language variation of the contact.

9. The method of claim 1, further comprising:
generating a report on all language variations spoken by contacts calling the call handling system.

10. The method of claim 1, further comprising:
generating a report on operator skill levels with respect to a predefined set of language variations.

11. The method of claim 1, further comprising:
generating a report on disparities between a number of contacts calling the call handling system and speaking a particular language variation and operators skilled in the particular language variation.

12. The method of claim 1, wherein initiating includes:
initiating a dialog between the contact and an interactive voice response interface.

13. The method of claim 1, wherein the language variation is an accent variation.

14. The method of claim 1, wherein the language variation is a dialect variation.

15. The method of claim 1, wherein identifying includes:
retrieving the contact's language variation from a contact database.

16. The method of claim 1, wherein identifying includes:
generating a set of confidence scores indicating a likelihood that the contact speaks each language variation within a set of language variations;
generating an inverse distance weighted confidence score for each of the language variations using the confidence score and an inversely weighted distance between the contact and each language variation; and
associating a language variation with the contact if that language variation's inverse distance weighted confidence score is above a predetermined value.

17. The method of claim 16, wherein generating an inverse distance weighted confidence score includes:
selecting a first language as a first origin;
calculating the distance between the first origin and each other language variation;
normalizing these distances with respect to the first origin;
multiplying each normalized distance by its respective confidence score to generate a set of multiplied results;
totaling the multiplied results to yield an inverse-distance weighted confidence score for the first language variation;
selecting a second language variation as a second origin; and
repeating the selecting, calculating, normalizing, multiplying, and totaling for the second origin.

18. The method of claim 16 wherein associating includes:
associating a language variation having a highest variation's inverse distance weighted confidence score with the contact.

19. The method of claim 16, wherein the distance is a physical distance.

20. The method of claim 16, wherein the distance is a virtual distance.

21. A method for operator selection comprising:
initiating, by a call handling system, a dialog between a contact and the call handling system; generating, by the call handling system, a set of confidence scores indicating a likelihood that the contact speaks each language variation within a set of language variations;
generating, by the call handling system, an inverse distance weighted confidence score for each of the language variations using the confidence score and an inversely weighted distance between the contact and each language variation; associating, by the call handling system, a language variation with the contact if that language variation's inverse distance weighted confidence score is above a predetermined value; determining, by the call handling system, a skill level with respect to the language variation associated with the contact for each operator within a set of operators following the initiation of the dialog between the contact and the call handling system, the skill level for each operator within the set of operators being determined on a real time basis while each operator is engaged in a dialog with a contact that has been transferred to that operator; selecting, by the call handling system, an operator whose skill level in the language variation associated with the contact is above a predetermined value; and transferring, by the call handling system, the dialog with the contact to the operator.

22. A non-transitory computer-usable medium embodying computer program code for performing operator selection, comprising: initiating a dialog between a contact and a call handling system; identifying a language variation spoken by the contact;
determining a skill level with respect to the language variation for each operator within a set of operators following the initiation of the dialog between the contact and the call handling system, the skill level for each operator within the set of operators being determined on a real time basis while each operator is engaged in a dialog with a contact that has been transferred to that operator;
selecting an operator whose skill level in the language variation is above a predetermined value; and
transferring the dialog with the contact to the operator.

23. The medium of claim 22, wherein identifying includes:
generating a set of confidence scores indicating a likelihood that the contact speaks each language variation within a set of language variations;
generating an inverse distance weighted confidence score for each of the language variations using the confidence score and an inversely weighted distance between the contact and each language variation; and
associating a language variation with the contact if that language variation's inverse distance weighted confidence score is above a predetermined value.

24. A system for operator selection comprising a:
means, within a call handling system, for initiating a dialog between a contact and a callthe call handling system; means, within the call handling system, for identifying a language variation spoken by the contact; means, within the call handling system, for determining a skill level with respect to the language variation for each operator within a set of operators following the initiation of the dialog between the contact and the call handling system, the skill level for each operator within the set of operators being determined on a real time basis while each operator is engaged in a dialog with a contact that has been transferred to that operator; means, within the call handling system, for selecting an operator whose skill level in the language variation is above a predetermined value; and means, within the call handling system, for transferring the dialog with the contact to the operator.

* * * * *

UNITED STATES PATENT AND TRADEMARK OFFICE
CERTIFICATE OF CORRECTION

PATENT NO. : 8,447,027 B2
APPLICATION NO. : 10/769240
DATED : May 21, 2013
INVENTOR(S) : Xiaofan Lin et al.

Page 1 of 1

It is certified that error appears in the above-identified patent and that said Letters Patent is hereby corrected as shown below:

In the Claims:

In column 8, line 35, in Claim 1, delete "the call handling" and insert -- handling --, therefor.

In column 9, line 46, in Claim 17, delete "language" and insert -- language variation --, therefor.

In column 9, line 47, in Claim 17, delete "the distance" and insert -- a distance --, therefor.

In column 10, line 51, in Claim 24, delete "callthe call" and insert -- call --, therefor.

Signed and Sealed this
First Day of October, 2013

Teresa Stanek Rea
*Deputy Director of the United States Patent and Trademark Office*